Jan. 28, 1958 K. J. AVERSTEN 2,821,417
CONNECTING DEVICE
Original Filed March 13, 1950

INVENTOR
KARL J. AVERSTEN,

BY *Larson & Whiting*

ATTORNEYS

United States Patent Office 2,821,417
Patented Jan. 28, 1958

2,821,417

CONNECTING DEVICE

Karl Joel Aversten, Lidingo, Sweden, assignor to Svenska Aktiebolaget Gasaccumulator, Lidingo (near Stockholm), Sweden, a corporation of Sweden Original application March 13, 1950, Serial No. 149,436, now Patent No. 2,711,915, dated June 28, 1955. Divided and this application May 5, 1955, Serial No. 506,335

2 Claims. (Cl. 287—20.2)

This invention relates to a connecting device and more particularly to a conductor for connecting rails ends. This application is a divisional application of my co-pending application Serial No. 149,436 filed March 13, 1950 for "A Connecting Device and Method of Production," now Patent No. 2,711,915, granted June 28, 1955.

Rail bonds as such, are well known in the prior art. Such devices comprise a stranded conductor having contact shoes disposed on each end thereof. According to prior art methods the contact shoe is welded to the rail end. Such prior-art methods are exceedingly time consuming and consequently, inefficient.

According to my invention, the contact shoe is secured to the rail end by means of solder. According to the disclosure of my parent application referred to hereinbefore there is provided a pin having solder disposed on the end thereof. The pin is inserted with one end in a welding gun and the opposite end of the pin is inserted in an aperture in the contact shoe. An electric arc is created between the pin and the metallic plate so that the solder melts and flows between the metallic plate and contact shoe and within the aperture between the strands of the conductor. The pin is then forced into the melted solder and is broken off to produce a firm connection between the parts. The advantage in this process is that it requires only a fraction of the time required by prior art processes, and an equally firm connection is formed.

The present invention is a modification of the pin and the method of connection described in my parent application. It can be seen that the above-described process requires the use of specially constructed soldering pins the necessity for which is eliminated by the present invention. A connector is provided comprising a stranded conductor having a contact shoe mounted on each end thereof. The contact shoe is provided with an aperture and into this aperture is pressed solder and flux. Thus, when using a connector such as disclosed herein, ordinary welding studs may be utilized to complete the connection.

An object of the present invention is to provide a connector for attachment with a metallic plate which connector has mounted thereon soldering means.

Another object of the present invention is to provide a connector for rail bonds in which a stranded conductor and apertured contact shoes are provided with soldering means disposed within the aperture.

Other objects and many of the attendant advantages of the present invention will become apparent upon consideration of the following detailed specification taken in connection with the accompanying drawing wherein.

Figure 1:
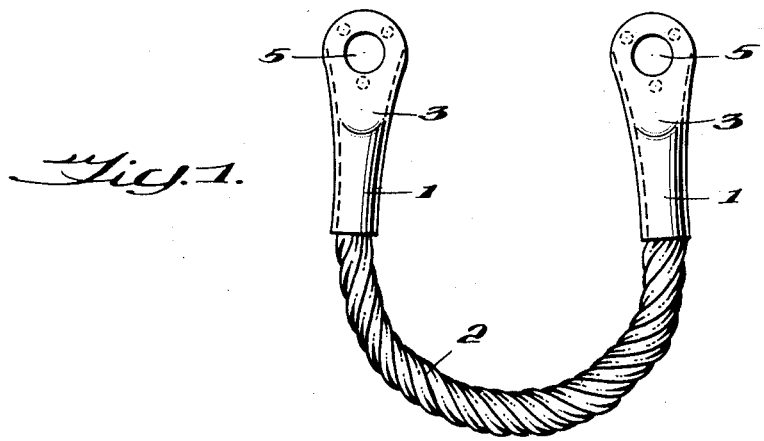
Fig. 1 is a plan view of a connector.
Figure 2:
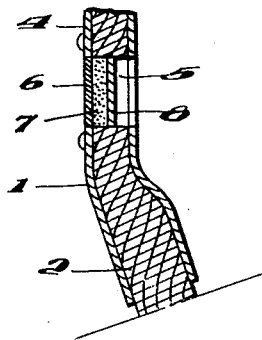
Fig. 2 is a sectional view through a contact shoe showing one form of the present invention.
Figure 3:
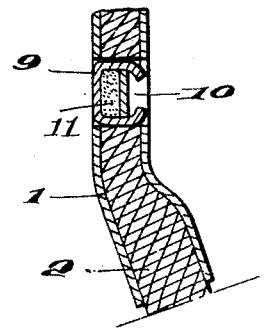
Fig. 3 is a sectional view through a contact shoe showing another form of the present invention.

Referring now specifically to the drawings there are shown contact shoes 1 mounted on the ends of a stranded metal conductor 2. These contact shoes comprise tubular conducting members which are pressed on the ends of the conductor so that the stranded conductor 2 extends throughout the length thereof as shown in Figs. 2 and 3. The end portions of the contact shoes are flattened, as shown, and are provided with apertures 5.

In Fig. 2 there is shown a thin metal plate 6 which is forced within the aperture 5. A predetermined amount of flux 7 is disposed on this thin metal plate and a cap 8 is pressed into the aperture to retain the flux in position between the plate 6 and cap 8. The plate 6 and cap 8 are made of solder and the device according to Fig. 2 may be used with a welding pin or with a soldering pin such as disclosed in Fig. 2 of my prior application.

In Fig. 3 there is shown a bowl shaped front plate 9 and a plate 10 between which is retained a quantity of flux 11. The front plate 9 has a rim portion which engages the plate 10 and retains this element in position. The front portion of plate 9 may be of relatively thin metal whereas the rim portions may be thicker to supply sufficient solder to fill the recess with a pin disposed therein.

It can be seen that according to the present invention the connector is provided with the soldering metal and the flux within the aperture in the contact shoe. By virtue of this construction ordinary welding pins may be used. Obviously, many modifications and variations of the present invention are possible in the light of the above teachings.

What is claimed as new and desired to be secured by Letters Patent is:

1. A connector for attachment to a metallic plate in which a stud is soldered within an aperture in the connector by stud-soldering apparatus comprising a member having an aperture therein, soldering means disposed within said aperture, said soldering means including a pair of metal plates having a melting point lower than that of the member and the stud, and flux disposed between said metal plates, said solder being adapted to melt with the stud in the aperture to secure the connector on the metallic plate.

2. A connector according to claim 1, one of said plates being contiguous with one surface of said member.

References Cited in the file of this patent

UNITED STATES PATENTS

| | | |
|---|---|---|
| 2,022,544 | Huber | Nov. 26, 1935 |
| 2,047,686 | Hodgson | July 14, 1936 |
| 2,268,416 | Nelson | Dec. 30, 1941 |
| 2,506,747 | Smith | May 9, 1950 |